United States Patent [19]

Laudon et al.

[11] Patent Number: 5,634,110

[45] Date of Patent: May 27, 1997

[54] CACHE COHERENCY USING FLEXIBLE DIRECTORY BIT VECTORS

[75] Inventors: James P. Laudon, Menlo Park; Daniel E. Lenoski, San Jose, both of Calif.

[73] Assignee: Silicon Graphics, Inc., Del.

[21] Appl. No.: 435,463

[22] Filed: May 5, 1995

[51] Int. Cl.[6] .................................................. G06F 13/00
[52] U.S. Cl. ........................ 395/472; 395/468; 395/475; 395/474; 364/134
[58] Field of Search ................................. 395/470, 471, 395/742, 451, 449, 468, 474, 475, 480; 364/134

[56] References Cited

U.S. PATENT DOCUMENTS

| | | | |
|---|---|---|---|
| 5,197,146 | 3/1993 | LeFetra | 395/471 |
| 5,265,232 | 11/1993 | Gannon et al. | 395/451 |
| 5,297,265 | 3/1994 | Frank et al. | 395/412 |
| 5,394,555 | 2/1995 | Hunter et al. | 395/800 |
| 5,535,116 | 7/1996 | Gupta et al. | 364/134 |
| 5,537,574 | 7/1996 | Elko et al. | 395/468 |

OTHER PUBLICATIONS

Manu Thapar, "Interleaved Dual Tag Directory Scheme for Cache Coherence", System Sciences, 1994 Annual Hawaii Int'l. Conference, vol. I. 1994.

"Residence Group Recording for Multiprocessor Caches", IBM Technical Disclosure Bulletin, vol. 36, No. 7, pp. 529–530. Jul. 1993.

David J. Lilja, "Improving Memory Utilization in Cache Coherence Directories", IEEE Transactions on Parallel and Distributed Systems, vol. 4, Issue 10. Oct. 1993.

Per Stenstrom, "A Survey of Cache Coherence Schemes for Multiprocessors", Computer Magazine, vol. 23, No. 6. Jun. 1990.

brian W. O'Krafka and A. Richard Newton, "An Empirical Evaluation of Two Memory–Efficient Directory Methods", Computer Architecture, 1990 International Symposium, pp. 138–147. Aug. 1990.

Milo Tomasevic and Veljko Milutinovic, "A Survey of Hardware Solutions for Maintenance of Cache Coherence in Shared Memory Multiprocessors", System Sciences, 1993 Hawaii Int'l. Conference, vol. I, pp. 863–872. 1993.

Akhilesh Kumar, "Efficient and Scalable Cache Coherence Schemes for Shared Memory Hypercube Multiprocessors", Supercomputing '94, pp. 498–507. 1994.

A. Agarwal, R. Simoni, J. Hennessey and M. Horowitz, "An Evaluation of Directory Schemes for Cache Coherence", *Proceedings of the 15th Int. Symp. on Computer Architecture*, Jun. 1988, pp. 280–289.

H. Burkhart III et al., "The KSR1: Bridging the Gap Between Shared Memory and MPP's", Kendall Square Research Corporation, 1993, pp. 285–294.

(List continued on next page.)

*Primary Examiner*—Tod R. Swann
*Assistant Examiner*—Keith W. Saunders
*Attorney, Agent, or Firm*—Sterne, Kessler, Goldstein & Fox P.L.L.C.

[57] ABSTRACT

A memory controller in a computer system is described. The memory controller maintains a directory comprising a plurality of entries. Each entry is associated with a memory block. The memory controller maintains an entry of the directory in a modified fine bit vector format when a memory block associated with the entry is cached in one or more nodes all of which are within a single partition of the computer system. The entry when maintained in the modified fine bit vector format comprises a partition field storing information identifying the single partition, and a modified fine bit vector field storing information identifying nodes in the single partition where the memory block is cached. The memory controller maintains the entry in a modified coarse bit vector format when the memory block is cached in multiple nodes distributed among P partitions of the computer system, where P is greater than one. The entry when maintained in the modified coarse bit vector format comprises Q partition fields each storing information identifying one of the P partitions, and Q modified coarse bit vector fields each storing information identifying nodes in one of the P partitions where the memory block is cached.

17 Claims, 4 Drawing Sheets

OTHER PUBLICATIONS

L. Censier and P. Fearrier, "A New Solution to Coherence Problems in Multi-Cache Systems", *IEEE Transactions on Computers*, vol. 27, No. 12, Dec. 1978, pp. 1112–1118.

A. Grupta, W. Weber and T. Mowry, "Reducing Memory and Traffic Requirements for Scalable Directory–Based Cache Conference Schemes", *Proceedings of the 1990 Conference on Parallel Processing*, Aug. 1990, pp. 312–321.

CACHE COHERENCY USING FLEXIBLE DIRECTORY BIT VECTORS

BACKGROUND OF THE INVENTION

1. Field of the Invention

The present invention relates generally to a system and method for cache coherency, and more particularly to a system and method for cache coherency using flexible directory bit vectors.

2. Related Art

A distributed computer system typically includes a plurality of processing nodes each having one or more processors, a cache connected to each processor, and main memory that can be accessed by any of the processors. The main memory is physically distributed among the processing nodes. In other words, each processing node includes a portion of the main memory. At any time, data elements stored in a particular main memory portion can also be stored in any of the caches existing in any of the processing nodes.

A cache coherency mechanism is conventionally utilized to maintain the coherency of data stored in the main memory portions and the caches. FIG. 1 illustrates a directory based cache coherency mechanism where a directory 106 includes an entry 108 for each memory block 104 in a portion of main memory 102 (a directory 106 exists in each processing node). The entries 108 identify the processing nodes where the associated memory blocks 104 are cached. A number of conventional approaches for achieving directory based cache coherency exist.

FIG. 2 illustrates a first conventional directory based cache coherency mechanism, in which each entry 108 includes a bit vector field 202 and a state field 206. The bit vector field 202 includes N bits, where each bit is associated with a processing node. If the memory block 104 associated with the entry 108 is cached in processing nodes A, B, and D, for example, then the bits in the bit vector field 202 corresponding to processing nodes A, B, and D are set (i.e., are equal to logical "1"). All other bits in the bit vector field 202 are not set (i.e., are equal to logical "0"). The state field 206 includes information that identifies the state of the associated memory block 104 (i.e., whether the memory block 104 is uncached, cached exclusively in one cache, cached non-exclusively by multiple caches, etc.).

This first convention approach is non-ideal, however, because it places a ceiling on the number of processing nodes that can be in the computer system. Specifically, according to this approach, the computer system can include at most N processing nodes. More processing nodes can be accommodated by increasing the size of the bit vector field 202 in each entry 108. This is not a satisfactory solution, however, since it increases storage overhead and ultimately degrades system performance and limits system size (i.e., the first approach is limited to a certain system size).

FIG. 3 illustrates a second conventional directory based cache coherency mechanism, in which each entry 108 includes a finite number of pointer fields 302 (in this case, three pointer fields 302) and a state field 304. The pointer fields 302 store pointers to processing nodes in which the associated memory block 104 is cached. The state field 304 includes information that identifies the state of the associated memory block 104 (i.e., whether the memory block 104 is uncached, cached exclusively in one cache, cached non-exclusively by multiple caches, etc.).

This second approach does not limit cacheability. If a memory block 104 is cached in more processing nodes than the number of pointers, then the system assumes that all of the nodes are caching the block 104. Thus, when some node wishes exclusive access to the block 104, the system invalidates the copies of the block 104 in all of the nodes. Thus, this second convention approach is non-ideal since it results in many invalidates.

The entry format shown in FIG. 2 can also be used to support a third conventional directory based cache coherency mechanism. According to this third approach, each bit of the bit vector 202 is associated with a group of processing nodes. For example, if the memory block 104 associated with an entry 108 is cached in processing nodes A, B, and J, and processing nodes A and B are in Group 1 and processing node J is in Group 2, then the bits in the bit vector field 202 corresponding to Groups 1 and 2 are set, and all other bits in the bit vector field 202 are not set. The state field 206 includes information that identifies the state of the associated memory block 104 (i.e., whether the memory block 104 is uncached, cached exclusively in one cache, cached non-exclusively by multiple caches, etc.).

This third conventional approach is non-ideal, however, because its representation of the caching state is very imprecise. This imprecision results in degrading system performance. Suppose, in the above example, that each group contains eight processing nodes, such that processing nodes A-H are in Group 1, and processing nodes I-P are in Group 2. Suppose again that the memory block 104 associated with an entry 108 is cached in processing nodes A, B, and J, such that the bits in the bit vector field 202 corresponding to Groups 1 and 2 are set. Now suppose that processing node A has been granted exclusive access to the memory block 104. In this case, an invalidate message must be sent to all of the processing nodes in Groups 1 and 2 (other than processing node A), even through the memory block 104 is only cached in processing nodes A, B, and I. Accordingly, the third conventional approach wastes valuable communication bandwidth, thereby degrading system performance. Note that this problem exists, even when the third approach is used in small computer systems.

Thus, what is required is an improved cache coherency mechanism in a computer system that results in minimal if any system performance degradation, and that requires minimal if any directory storage overhead.

SUMMARY OF THE INVENTION

The present invention is directed to a computer system comprising a communication network and a plurality of processing nodes. Each processing node is connected to the communication network and includes at least a portion of main memory and a memory controller.

The memory controller maintains a directory comprising a plurality of entries. Each entry is associated with one of the memory blocks.

The memory controller maintains an entry of the directory in a modified fine bit vector format when a memory block associated with the entry is cached in one or more processing nodes all of which are within a single partition of the computer system. The entry when maintained in the modified fine bit vector format comprises a partition field storing information identifying the single partition, and a modified fine bit vector field storing information identifying processing nodes in the single partition where the memory block is cached.

The modified fine bit vector field comprises a plurality of bits each associated with a processing node in the single partition. The memory controller operates to set a bit of the modified fine bit vector field if the memory block is cached in a processing node associated with the bit.

The memory controller maintains the entry in a modified coarse bit vector format when the memory block is cached in multiple processing nodes distributed among P partitions of the computer system, where P is greater than one. The entry when maintained in the modified coarse bit vector format comprises Q partition fields each storing information identifying one of the P partitions, and Q modified coarse bit vector fields each storing information identifying processing nodes in one of the P partitions where the memory block is cached. Q is greater than or equal to P.

Each modified coarse bit vector field comprises a plurality of bits each associated with multiple processing nodes in one of the P partitions. The memory controller operates to set a bit of the modified coarse bit vector field if the memory block is cached in at least one processing node associated with the bit.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

Figure 4:
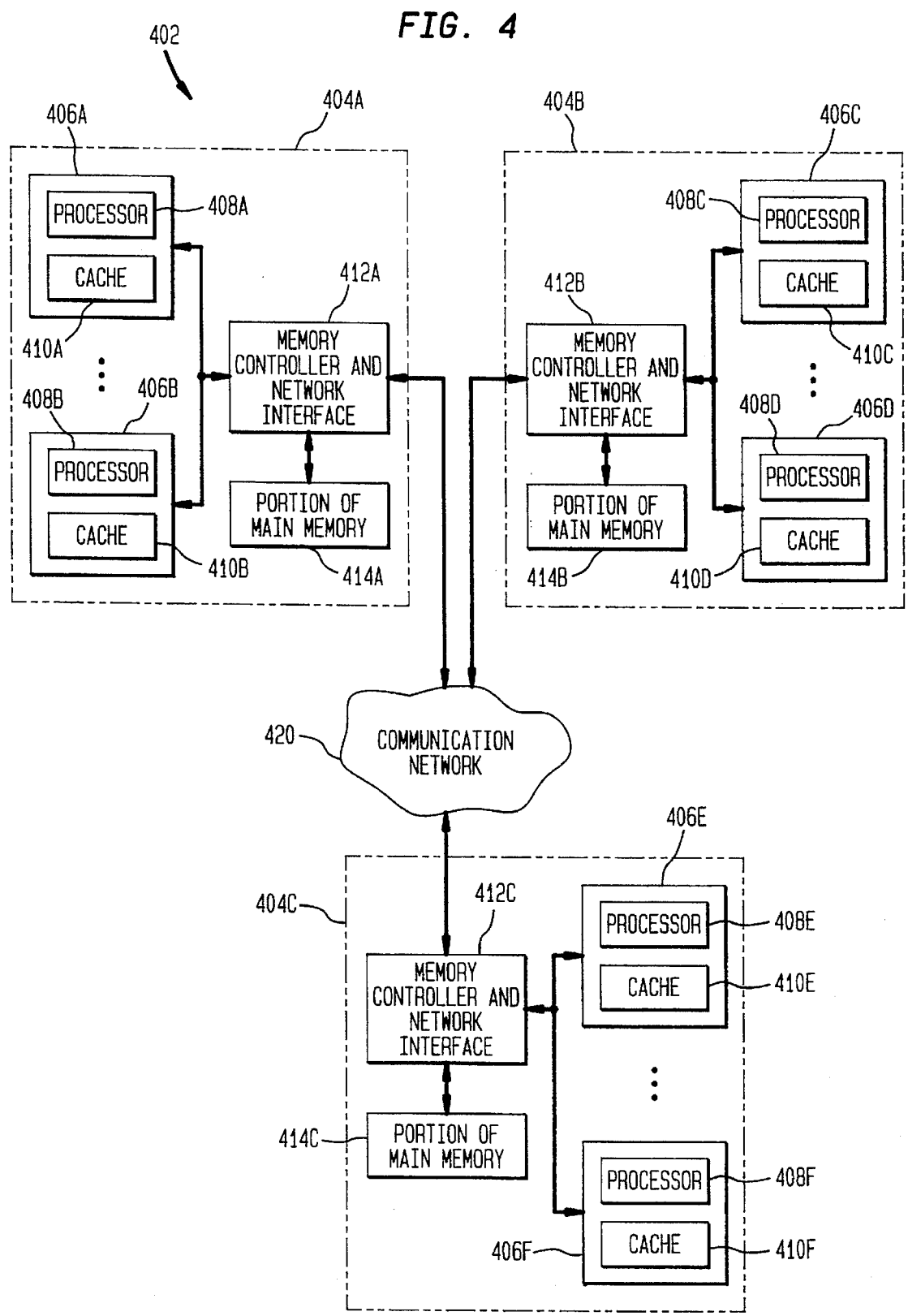
FIG. 4 is a block diagram of a computer system according to a preferred embodiment of the present invention.

FIG. 4 is a block diagram of a distributed computer system 402, preferably a distributed, non-uniform memory access (NUMA) computer system 402. It should be understood that, although the invention is described herein with respect to a distributed computer system, the invention works equally well with other types of computer systems, such as a bus based system, non-distributed memory computer systems, etc.

The computer system 402 includes a plurality of processing nodes 404 (preferably 512 processing nodes 404), which are physically distinct and physically separated from one another. The processing nodes 404 communicate with each other over a communication network 420, representing any well known data communication means, such as a bus, multistage interconnection network, local area network, wide area network, etc., or any combination of these.

Each processing node 404 includes one or more computing nodes 406 (preferably, each processing node 404 includes two computing nodes 406). Each computing node 406 includes a processor 408 and a cache 410. Each processing node 404 also includes a memory controller and network interface 412. The processors 408 in any particular processing node 404 communicate with other devices connected to the communication network 420 via the memory controller and network interface 412 contained in that processing node 404.

Each processing node 404 also includes a portion of main memory 414. The portions of main memory 414 in all of the processing nodes 404 collectively represent the main memory of the computer system 402. Any processor 408 in any processing node 404 can access data stored in the portion of main memory 414 contained in any other processing node 404. Access to data contained in the portion of main memory 414 of any particular processing node 404 is controlled by the memory controller and network interface 412 contained in that same processing node 404.

At any time, data elements stored in any main memory portion 414 can also be stored in any of the caches 410 existing in any of the processing nodes 404. Each processing node 404 includes a directory based cache coherency mechanism (not shown) to maintain the coherency of data stored in its main memory portion 414. The cache coherency mechanism preferably forms part of the memory controller and network interface 412 in the processing node 404.

Figure 1:
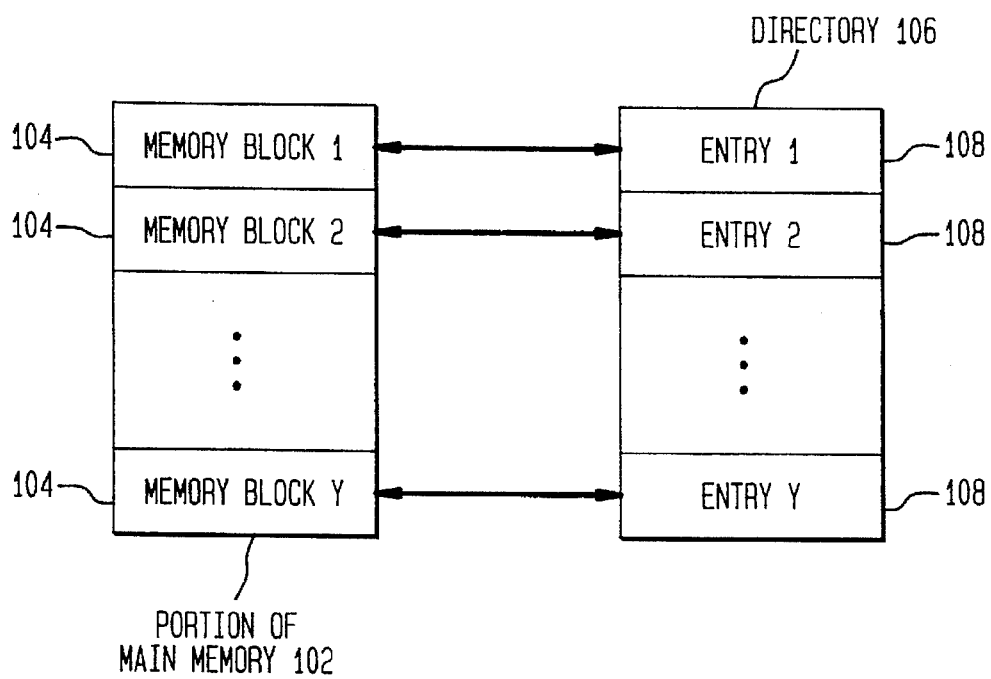
FIG. 1 is a schematic diagram of a portion of main memory and a corresponding directory.
Figure 2:
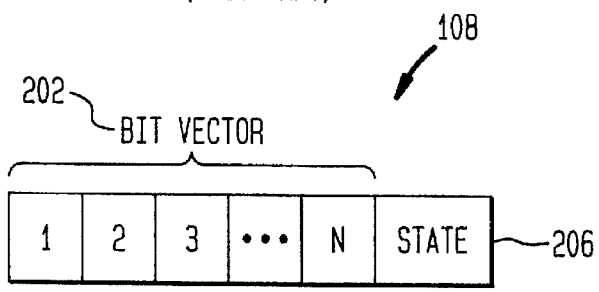
FIGS. 2 and 3 illustrate conventional directory entry formats.

Each main memory portion 414 includes Y memory blocks 104, individually labeled memory block 1, memory block 2, ..., memory block Y (see FIG. 1). The value of Y is implementation dependent. According to the present invention, each processing node 404 includes a directory 106 having a directory entry 108 for each memory block 104, such that the directory 106 includes Y directory entries 108 (individually labeled directory entry 1, directory entry 2, ..., directory entry Y). The directory 106 is preferably stored in dynamic random access memory (DRAM). In one embodiment, the directory 106 is stored in the main memory portion 414.

According to the present invention, there are at least four formats for the directory entries 108: pointer format 502, coarse bit vector format 602, modified fine bit vector format 702, and modified coarse bit vector format 802. The format used for any particular directory entry 108 changes dynamically during run-time, and is dependent at any time on the cache state of the memory block 104 (i.e., the nodes in which the memory block 104 is stored) associated with the directory entry 108. Preferably, the length of a directory entry 108 is always the same, no matter which format 502, 602, 702, 802 it is in. Since they have multiple formats, the directory entries 108 are also called "flexible directory bit vectors."

It should be understood that the present invention could be implemented with a subset of these four formats. For example, the present invention could be implemented with only the coarse bit vector format 602 and the modified fine bit vector format 702. The present invention may also utilize other formats, such as the pointer format shown in FIG. 3. Variations to the implementation discussed herein so as to implement a system having a subset of the four formats (or other formats) will be apparent to persons skilled in the relevant an(s).

The pointer format 502, coarse bit vector format 602, modified fine bit vector format 702, and modified coarse bit vector format 802 shall now be discussed in detail. For ease of illustration, the following description is made with reference to processing node 404A, although it should be understood that the following applies equally well to all processing nodes 404.

Figure 5:
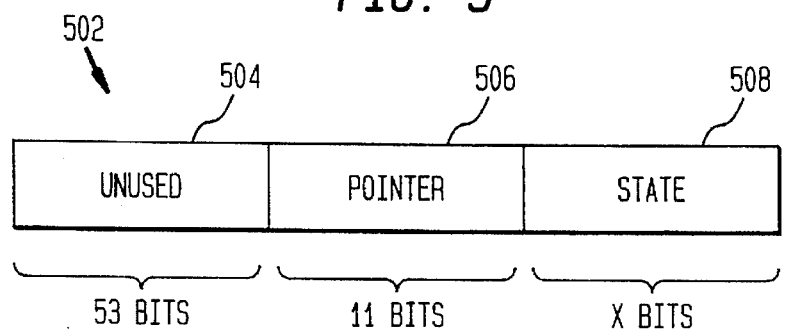
FIGS. 5-8 illustrate directory entry formats according to the present invention.

FIG. 5 illustrates the pointer format 502. The memory controller and network interface 412A (specifically, the cache coherency mechanism contained therein) in the processing node 404A places a directory entry 108 in the pointer format 502 if the memory block 104 associated with the directory entry 108 is not cached, or is cached exclusively by one processing node 404.

When in the pointer format 502, a directory entry 108 has an unused field 504, a pointer field 506, and a state field 508. The unused field 504 is preferably 53 bits, the pointer field 506 is preferably 11 bits (or any other length sufficient to accommodate a pointer), and the state field 508 is preferably X bits, where the value of X is implementation dependent.

The unused field 504 is not used. The pointer field 506 includes a pointer to a processing node 404 where the associated memory block 104 is cached (if the memory block 104 is uncached, then the pointer field 506 is not used).

For example, assume that memory block 2 in the main memory portion 414A of the processing node 404A is stored in the cache 410C connected to the processor 408C in the processing node 404B. In this case, the memory block 2 is said to be cached in the processing node 404B. In this example, the pointer field 506 in the directory entry 2 (of the directory 106 maintained by the processing node 404A) associated with this memory block 2 stores a pointer (or address) that points to processing node 404B.

The state field 508 includes information that identifies the format of the directory entry, and the state of the associated memory block 104 (e.g., whether the memory block 104 is uncached, or cached exclusively in one cache).

Figure 6:
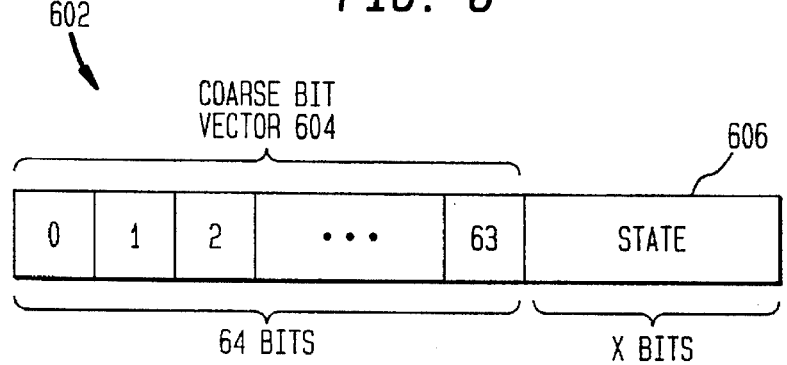

FIG. 6 illustrates the coarse bit vector format 602. The memory controller and network interface 412A (specifically, the cache coherency mechanism contained therein) in the processing node 404A places a directory entry 108 in the coarse bit vector format 602 if the memory block 104 associated with the directory entry 108 is cached in processing nodes 404 existing in more than M partitions.

According to an embodiment of the present invention, the computer system 402 includes a plurality of partitions each comprising one or more processing nodes 404. Preferably, the invention includes eight partitions, and each partition includes 64 processing nodes 404. However, the invention works equally well with different numbers of partitions and different numbers of processing nodes 404 per partition.

Suppose that the computer system 402 includes Partitions 1–4, and that a memory block 104 is cached in processing nodes 404 existing in Partitions 1, 2, and 4. In this case, the directory entry 108 corresponding to this memory block 104 is placed in the coarse bit vector format 602 since the memory block 104 is cached in more than M partitions, assuming that M is equal to two.

M is preferably equal to two, although the invention works equally well with other values of M. Specifically, if an implementation of the invention supports both the modified fine bit vector format 702 and the modified coarse bit vector format 802, then M is equal to two. However, if an implementation of the invention supports the modified fine bit vector format 702, but does not support the modified coarse bit vector format 802, then M is equal to one. This is described further below.

When in the coarse bit vector format 602, a directory entry 108 has a coarse bit vector field 604, and a state field 606. The coarse bit vector field 604 is preferably A/B bits, where A is equal to the number of processing nodes 404 in the computer system 402 and B is equal to the number of processing nodes 404 represented by each bit of the coarse bit vector field 604 (this is described further below). Preferably, A is equal to 512 and B is equal to 8, such that the coarse bit vector field 604 is equal to 64 bits. The state field 606 is preferably X bits.

Each bit in the coarse bit vector field 604 corresponds to preferably eight processing nodes 404 in the computer system 402. A bit of the coarse bit vector field 604 is set (i.e., has a value of logical "1") if the memory block 104 corresponding to the directory entry 108 is cached in at least one of the processing nodes 404 associated with the bit. A bit of the coarse bit vector field 604 is not set (i.e., has a value of logical "0") if the memory block 104 corresponding to the directory entry 108 is not cached in any of the processing nodes 404 associated with the bit.

The state field 606 includes information that identifies the format of the directory entry, and the state of the associated memory block 104 (i.e., whether the memory block 104 is uncached, or cached exclusively in one cache).

Figure 7:
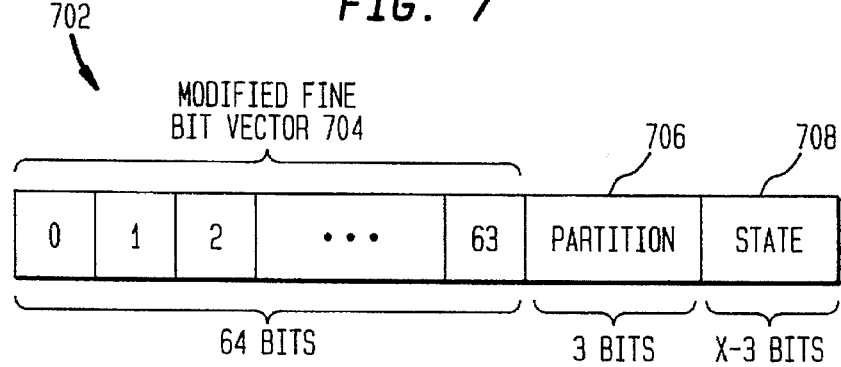

FIG. 7 illustrates the modified fine bit vector format 702. The memory controller and network interface 412A (specifically, the cache coherency mechanism contained therein) in the processing node 404A places a directory entry 108 in the modified fine bit vector format 702 if the memory block 104 associated with the directory entry 108 is cached in a single partition (specifically, cached in two or more processing nodes 404 all of which reside in a single partition). Note that the modified fine bit vector format 702 can also be used to encode the situations where zero or one nodes have a cached copy instead of employing the pointer format for those cases.

When in the modified fine bit vector format 704, a directory entry 108 has a modified fine bit vector field 704, a partition field 706, and a state field 708. The modified fine bit vector field 704 is preferably A/C bits, where A is equal to the number of processing nodes 404 in the computer system 402 and C is equal to the number of partitions in the computer system 402. Preferably, A is equal to 512 and C is equal to 8, such that the modified fine bit vector field 704 is 64 bits. The partition field 706 is preferably D bits, where $2^D$ is equal to C. Since C is preferably equal to 8, the partition field 706 is preferably 3 bits. The state field 708 is preferably X-D bits.

At any time, a directory entry 108 in the modified fine bit vector format 702 represents only one of the partitions of the computer system 402. Specifically, each bit of the modified fine bit vector field 704 in a directory entry 108 corresponds to one of the processing nodes 404 in a partition. A bit of the modified fine bit vector field 704 is set (i.e., has a value of logical "1") if the memory block 104 corresponding to the directory entry 108 is cached in the processing node 404 associated with the bit. A bit of the modified fine bit vector field 704 is not set (i.e., has a value of logical "0") if the memory block 104 corresponding to the directory entry 108 is not cached in the processing node 404 associated with the bit.

The partition field 706 contains information that identifies the partition that is being represented by the directory entry 108. For example, if a directory entry 108 represents Partition 1, then the partition field 706 preferably stores the binary value "001." If a directory entry 108 represents Partition 5, then the partition field 706 preferably stores the binary value "101."

The state field 708 includes information that identifies the format of the directory entry 108 (that the directory entry 108 is in the modified fine bit vector format 704), and the state of the associated memory block 104 (i.e., that the memory block 104 is shared).

Figure 3:
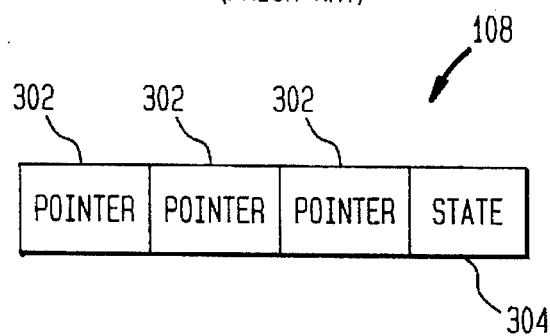

The modified fine bit vector field 704 of the present invention is advantageous because it enables the precise identification of the processing nodes 404 where a memory block 104 is cached, even when more than one processing node 404 caches the memory block 104 (or when more processing nodes 404 than the number of pointers 302 cache the memory block 104 when the binary pointer format in FIG. 3 is used), and even when the number of processing nodes 404 in the computer system 402 is greater than the number of bits in the modified fine bit vector field 704. Thus, the modified fine bit vector field 704 eliminates the transmission of unnecessary invalidation messages (this is a problem that plagued the third conventional solution described above). The present invention achieves this advantage without increasing the size of the directory entries 108. This is the case, since with the modified fine bit vector field format 702, the state field 708 is reduced by preferably three bits (i.e., by the size of the partition field 706). This savings is achieved by encoding of the state information in the state field 708. (It is noted that, when in this format, only a subset of all possible states are applicable. Accordingly, a well known encoding scheme such as Huffman encoding can be employed to reduce the size of the field.) In some implementations, it may be necessary to increase the size of the directory entries 108, but such increase would be minimized by encoding of the state information.

The modified fine bit vector format 702 cannot be used if the memory block 104 is cached in multiple partitions. According to an embodiment of the present invention, however, the modified coarse bit vector format 802 can be used (instead of the coarse bit vector format 602) as long as the memory block 104 is cached in no more than M partitions.

Figure 8:
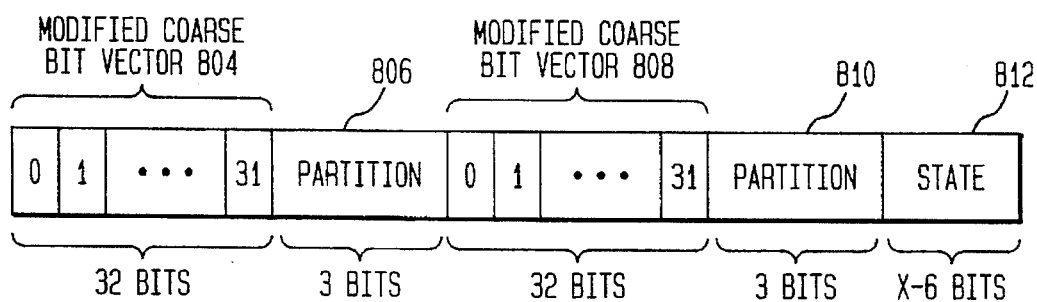

FIG. 8 illustrates the modified coarse bit vector format 802 according to an embodiment of the invention. The memory controller and network interface 412A (specifically, the cache coherency mechanism contained therein) in the processing node 404A places a directory entry 108 in the modified coarse bit vector format 802 if the memory block 104 associated with the directory entry 108 is cached in no more than M partitions, where M is preferably equal to two (preferably, to be placed in the modified coarse bit vector format 802, a directory entry 108 must be cached in more than one partition, but no more than M partitions).

When in the modified coarse bit vector format 802, a directory entry 108 has a first modified coarse bit vector field 804, a first partition field 806, a second modified coarse bit vector field 808, a second partition field 810, and a state field 812. The first and second modified coarse bit vector fields 804, 808 are each preferably A/(E*C) bits, where A is equal to the number of processing nodes 404 in the computer system 402, C is equal to the number of partitions in the computer system 402, and E is equal to the number of processing nodes 404 represented by each bit in the first and second modified coarse bit vector fields 804, 808. Preferably, A is equal to 512, C is equal to 8, and E is equal to 2, such that each modified coarse bit vector field 804, 808 is 32 bits. The first and second partition fields 806, 810 are each preferably D bits, where $2^D$ is equal to C. Since C is preferably equal to 8, the first and second partition fields 806, 810 are each preferably 3 bits. The state field 812 is preferably X-2*D bits.

At any time, the first and second modified coarse bit vector fields 804, 808 in a directory entry 108 each represents one of the partitions of the computer system 402. Specifically, each bit of the first modified coarse bit vector field 804 in the directory entry 108 corresponds to E (preferably 2) of the processing nodes 404 in one partition, and is set only if the memory block 104 corresponding to the directory entry 108 is cached in one or both of these processing nodes 404. The first partition field 806 contains information that identifies the partition that is being represented by the first modified coarse bit vector field 804.

Similarly, each bit of the second modified coarse bit vector field 808 in the directory entry 108 corresponds to E (preferably 2) of the processing nodes 404 in another partition, and is set only if the memory block 104 corresponding to the directory entry 108 is cached in one or both of these processing nodes 404. The second partition field 810 contains information that identifies the partition that is being represented by the second modified coarse bit vector field 808.

The state field 812 includes information that identifies the format of the directory entry 108 (that the entry 108 is in the modified coarse bit vector format 802), and the state of the associated memory block 104 (i.e., that the memory block 104 is shared).

The modified coarse bit vector format 802 is advantageous because it is more precise than the coarse bit vector format 602. It is not as precise as the pointer format 502 or the modified fine bit vector format 702. However, the modified coarse bit vector format 802 does not substantially contribute to system overhead since it only causes at most one unneeded invalidation message to be sent per bit set. This is in contrast to the coarse format which could send up to seven unneeded invalidation messages per bit set.

These advantages of the modified coarse bit vector format 802 are achieved without increasing the size of the directory entries 108 by encoding state information in the state field 812. (It is noted that, when in this format, only a subset of all possible states are applicable. Accordingly, a well known encoding scheme such as Huffman encoding can be employed to reduce the size of the field.) In some implementations, it may be necessary to increase the size of the directory entries 108, but such increase would be minimized by encoding of the state information.

The modified coarse bit vector format 802 can be modified to represent more than two partitions by adding additional modified coarse bit vector fields and partition fields (one set for each additional partition). In order to implement such a modification, it will be necessary to increase the size of each directory entry 108, or increase the number of processing nodes 404 that are represented by each bit of each modified coarse bit vector field (i.e., increase E). Additional details of these modifications will be apparent to persons skilled in the relevant art(s) based on the discussion contained herein.

The memory controller and network interface 412 (specifically, the cache coherency mechanism contained therein) in each processing node 404 independently manages each directory entry 108 in the directory 106 contained in the processing node 404. In particular, the memory controller and network interface 412 dynamically selects the appropriate format 502, 602, 702, 802 for each directory entry 108, and processes the directory entries 108 according to their respective formats.

Figure 9:
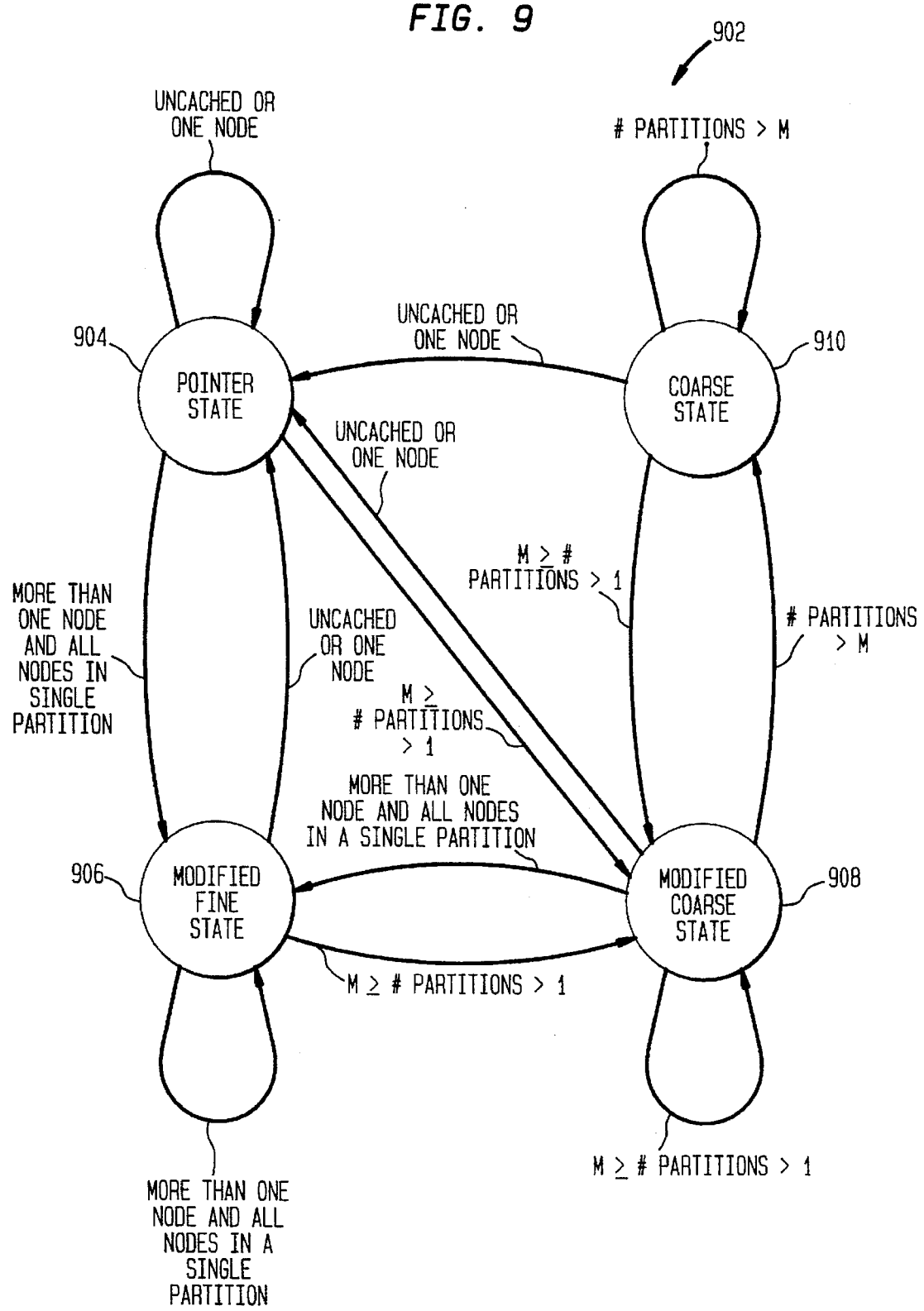
FIG. 9 is a state diagram representing the operation of the present invention.

FIG. 9 illustrates a state diagram 902 representing the operation of the memory controller and network interface 412 with regard to the processing of a directory entry 108 contained in the directory 106.

For each directory entry 108, the memory controller and network interface 412 is at any time in one of four states: a pointer state 904, a modified fine state 906, a modified coarse state 908, or a coarse state 910. When in the pointer state 904, the memory controller and network interface 412 maintains the directory entry 108 in the pointer format 502, and processes and interprets the directory entry 108 accordingly (as described above). When in the modified fine state 906, the memory controller and network interface 412 maintains the directory entry 108 in the modified fine bit vector format 702, and processes and interprets the directory entry 108 accordingly (as described above). When in the modified coarse state 908, the memory controller and network interface 412 maintains the directory entry 108 in the modified coarse bit vector format 802, and processes and interprets the directory entry 108 accordingly (as described above). When in the coarse state 910, the memory controller and network interface 412 maintains the directory entry 108 in the coarse bit vector format 602, and processes and interprets the directory entry 108 accordingly (as described above).

The memory controller and network interface 412 stays in the pointer state 904 as long as the memory block 104 associated with the directory entry 108 is uncached, or cached by a single processing node 404. The memory controller and network interface 412 transitions from the pointer state 904 to the modified fine state 906 when the memory block 104 becomes cached in multiple processing nodes 404, all of which are in a single partition. The memory controller and network interface 412 transitions from the pointer state 904 to the modified coarse state 908 when the memory block 104 becomes cached in more than one partition, but at most M partitions.

The memory controller and network interface 412 remains in the modified fine state 906 as long as the memory block 104 is cached in multiple processing nodes 404, all of which are in a single partition. If the memory block 104 becomes uncached or cached in one processing node 404, then the memory controller and network interface 412 returns to the pointer state 904. If the memory block 104 becomes cached in multiple processing nodes 404 distributed among multiple partitions, where the number of partitions is greater than one but less than or equal to M (where M is preferably equal to two), then the memory controller and network interface 412 transitions to the modified coarse state 908.

The memory controller and network interface 412 remains in the modified coarse state 908 as long as the memory block 104 is cached in multiple processing nodes 404 distributed among multiple partitions, where the number of partitions is greater than one but less than or equal to M. The memory controller and network interface 412 returns to the modified fine state 906 if the memory block 104 becomes cached in multiple processing nodes 404, all of which are in a single partition. Alternatively, the memory controller and network interface 412 returns to the pointer state 904 if the memory block 104 becomes uncached or cached in a single processing node 404. The memory controller and network interface 412 transitions to the coarse state 910 when the memory block 104 becomes cached in multiple processing nodes 404 distributed among multiple partitions, where the number of partitions is greater than M.

The memory controller and network interface 412 remains in the coarse state 910 as long as the memory block 104 is cached in multiple processing nodes 404 distributed among multiple partitions, where the number of partitions is greater than M. The memory controller and network interface 412 returns to the pointer state 904 if the memory block 104 becomes uncached or cached in a single processing node 404. Alternatively, the memory controller and network interface 412 returns to the modified coarse state 908 if the memory block 104 becomes cached in multiple processing nodes 404 distributed among multiple partitions, where the number of partitions is greater than one but less than or equal to M.

Additional transitions among the states 904, 906, 908, 910 is possible and will be apparent to persons skilled in the relevant art(s).

In one embodiment, the state diagram 902 shown in FIG. 9 is implemented using software that, when executed, causes a processor to operate as described above. In another embodiment, the state diagram 902 is implemented as a hardware state machine. Other implementations will be apparent to persons skilled in the relevant art(s).

The present invention facilitates system expandability. If the computer system 402 has less than 64 processing nodes 402, then the pointer format 502 and the modified fine bit vector format 704 will be used exclusively. Thus, the directory entries 108 will always precisely identify the processing nodes 404 where memory blocks 104 are cached. As the computer system 402 grows past 64 processing nodes 402, it is still likely that the pointer format 502, the modified fine bit vector format 704, and the modified coarse bit vector format 802 will be predominantly used, and the coarse bit vector format 602 will be sparingly used. This is the case, since most large-scale applications exhibit locality in their data sharing behavior (such that shared data will be shared by processing nodes 402 in the same partitions). Accordingly, the present invention provides precise memory block sharing information (and achieves the associated performance advantages) for all system sizes, thereby enhancing marketability and encouraging customer investment in computer systems implemented according to the present invention.

In one embodiment of the invention, critical parameter information such as the number of processing nodes 404, the number of partitions, the number of nodes 404 in each partition, the size of bit vector fields 604, 704, 804, 808, etc., are stored in software adjustable tables, thereby further enhancing and facilitating expandability.

It should be understood that the directory and directory-based schemes discussed herein can be used in applications other than the distributed computer system 402 and processing nodes 404 shown in FIG. 4. For example, the directories can work with input/output devices, other types of caches, bus based computer systems, etc.

Also, the directory need not work with systems wherein memory and processors are co-located. For example, the directory can work with nodes containing memory only, or all memory could be co-located, or the nodes could contain main memory and no cache memory (thus, the term "cached" as used herein may also be interpreted to mean "stored in non-cache memory" unless stated otherwise).

Thus, the term "processing node" or "node" as used herein represents a node containing one or more processors co-located with memory, and alternatively represents a node containing just memory, an input/output device, etc.

In the above, directory entries are described as each being associated with a single block of memory. It should be understood, however, that the present invention works equally well with schemes where directory entries are each associated with one or more memory blocks.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. In a node comprising at least a portion of main memory having a plurality of memory blocks, said node being part of a computer system having a plurality of partitions each comprising a plurality of nodes, a method for denoting nodes in which said memory blocks are cached, said method comprising the steps of:

(1) maintaining a directory comprising a plurality of entries, each entry associated with one or more of said memory blocks; and (2) maintaining an entry of said directory in a modified fine bit vector format when a memory block associated with said entry is cached in one or more nodes all of which are within a single partition of said computer system, said entry when maintained in said modified fine bit vector format comprising a partition field storing information identifying said single partition, and a modified fine bit vector field storing information identifying nodes in said single partition where said memory block is cached.

2. The method of claim 1, wherein said modified fine bit vector field comprises a plurality of bits each associated with a node in said single partition, step (2) comprising the step of:

setting a bit of said modified fine bit vector field if said memory block is cached in a node associated with said bit.

3. In a node comprising at least a portion of main memory having a plurality of memory blocks, said node being part of a computer system having a plurality of partitions each comprising a plurality of nodes, a method for denoting nodes in which said memory blocks are cached, said method comprising the steps of:

(1) maintaining a directory comprising a plurality of entries, each entry associated with one or more of said memory blocks; and (2) maintaining an entry of said directory in a modified coarse bit vector format when a memory block associated with said entry is cached in multiple nodes distributed among P partitions of said computer system, P being greater than one, said entry when maintained in said modified coarse bit vector format comprising Q partition fields each storing information identifying one of said P partitions, and Q modified coarse bit vector fields each storing information identifying nodes in one of said P partitions where said memory block is cached, Q being greater than or equal to P.

4. The method of claim 3, wherein each modified coarse bit vector field comprises a plurality of bits each associated with multiple nodes in one of said P partitions, step (2) comprising the step of:

setting a bit of said modified coarse bit vector field if said memory block is cached in at least one node associated with said bit.

5. In a node comprising at least a portion of main memory having a plurality of memory blocks, said node being part of a computer system having a plurality of partitions each comprising a plurality of nodes, a method for denoting nodes in which said memory blocks are cached, said method comprising the steps of:

(1) maintaining a directory comprising a plurality of entries, each entry associated with one or more of said memory blocks;

(2) maintaining an entry of said directory in a modified fine bit vector format when a memory block associated with said entry is cached in one or more nodes all of which are within a single partition of said computer system, said entry when maintained in said modified fine bit vector format comprising a partition field storing information identifying said single partition, and a modified fine bit vector field storing information identifying nodes in said single partition where said memory block is cached;

(3) maintaining said entry in a modified coarse bit vector format when said memory block is cached in multiple nodes distributed among P partitions of said computer system, P being greater than one, said entry when maintained in said modified coarse bit vector format comprising Q partition fields each storing information identifying one of said P partitions, and Q modified coarse bit vector fields each storing information identifying nodes in one of said P partitions where said memory block is cached; and (4) dynamically switching in real time between at least said modified fine bit vector format and said modified coarse bit vector format, depending upon a current cache state of said memory block.

6. The method of claim 5, wherein said modified fine bit vector field comprises a plurality of bits each associated with a node in said single partition, step (2) comprising the step of:

setting a bit of said modified fine bit vector field if said memory block is cached in a node associated with said bit.

7. The method of claim 5, wherein each modified coarse bit vector field comprises a plurality of bits each associated with multiple nodes in one of said P partitions, step (3) comprising the step of:

setting a bit of said modified coarse bit vector field if said memory block is cached in at least one node associated with said bit.

8. A computer system, comprising:

a communication network; and a plurality of nodes, each connected to said communication network and comprising at least a portion of main memory having a plurality of memory blocks and a memory controller;

said memory controller comprising:

directory maintaining means for maintaining a directory comprising a plurality of entries, each entry associated with one or more of said memory blocks; and modified fine bit vector format maintaining means for maintaining an entry of said directory in a modified fine bit vector format when a memory block associated with said entry is cached in one or more nodes all of which are within a single partition of said computer system, said entry when maintained in said modified fine bit vector format comprising a partition field storing information identifying said single partition, and a modified fine bit vector field storing information identifying nodes in said single partition where said memory block is cached.

9. The computer system of claim 8, wherein said modified fine bit vector field comprises a plurality of bits each associated with a node in said single partition, said modified fine bit vector format maintaining means comprising:

means for setting a bit of said modified fine bit vector field if said memory block is cached in a node associated with said bit.

10. The computer system of claim 8, wherein said memory controller further comprises:

modified coarse bit vector format maintaining means for maintaining said entry in a modified coarse bit vector format when said memory block is cached in multiple nodes distributed among P partitions of said computer system, P being greater than one, said entry when maintained in said modified coarse bit vector format comprising Q partition fields each storing information identifying one of said P partitions, and Q modified coarse bit vector fields each storing information identifying nodes in one of said P partitions where said memory block is cached and;

means for dynamically switching in real time between said modified fine bit vector format and said modified coarse bit vector format, depending upon a current cache state of said memory block.

11. The computer system of claim 10, wherein each modified coarse bit vector field comprises a plurality of bits each associated with multiple nodes in one of said P partitions, said modified coarse bit vector format maintaining means comprising:

means for setting a bit of said modified coarse bit vector field if said memory block is cached in at least one node associated with said bit.

12. In a node comprising at least a portion of main memory having a plurality of memory blocks, said node being part of a computer system having a plurality of partitions each comprising a plurality of nodes, a memory controller comprising:

directory maintaining means for maintaining a directory comprising a plurality of entries, each entry associated with one or more of said memory blocks; and modified fine bit vector format maintaining means for maintaining an entry of said directory in a modified fine bit vector format when a memory block associated with said entry is cached in one or more nodes all of which are within a single partition of said computer system, said entry when maintained in said modified fine bit vector format comprising a partition field storing information identifying said single partition, and a modified fine bit vector field storing information identifying nodes in said single partition where said memory block is cached.

13. The memory controller of claim 12, wherein said modified fine bit vector field comprises a plurality of bits each associated with a node in said single partition, said modified fine bit vector format maintaining means comprising:

means for setting a bit of said modified fine bit vector field if said memory block is cached in a node associated with said bit.

14. The memory controller of claim 12, further comprising:

modified coarse bit vector format maintaining means for maintaining said entry in a modified coarse bit vector format when said memory block is cached in multiple nodes distributed among P partitions of said computer system, P being greater than one, said entry when maintained in said modified coarse bit vector format comprising Q partition fields each storing information identifying one of said P partitions, and Q modified coarse bit vector fields each storing information identifying nodes in one of said P partitions where said memory block is cached and means for dynamically switching in real time between said modified fine bit vector format and said modified coarse bit vector format, depending upon a current cache state of said memory block.

15. The memory controller of claim 14, wherein each modified coarse bit vector field comprises a plurality of bits each associated with multiple nodes in one of said P partitions, said modified coarse bit vector format maintaining means comprising:

means for setting a bit of said modified coarse bit vector field if said memory block is cached in at least one node associated with said bit.

16. In a node comprising at least a portion of main memory having a plurality of memory blocks, said node being part of a computer system having a plurality of partitions each comprising a plurality of nodes, a memory controller comprising:

directory maintaining means for maintaining a directory comprising a plurality of entries, each entry associated with one or more of said memory blocks; and modified coarse bit vector format maintaining means for maintaining each said entry in a modified coarse bit vector format when said one or more associated memory blocks is stored in multiple nodes distributed among P partitions of said computer system, said entry when maintained in said modified coarse bit vector format comprising Q partition fields each storing information identifying one of said P partitions, and Q modified coarse bit vector fields each storing information identifying nodes in one of said P partitions where said memory block is stored.

17. The memory controller of claim 16, wherein each modified coarse bit vector field comprises a plurality of bits each associated with multiple nodes in one of said P partitions, said modified coarse bit vector format maintaining means comprising:

means for setting a bit of said modified coarse bit vector field if said memory block is stored in at least one node associated with said bit.

* * * * *

UNITED STATES PATENT AND TRADEMARK OFFICE
CERTIFICATE OF CORRECTION

PATENT NO. : 5,634,110

DATED : May 27, 1997

INVENTORS : Laudon *et al.*

It is certified that an error appears in the above-identified patent and that said Letters Patent is hereby corrected as shown below.

On the title page, in item 73, please change the assignee address from "Del." to --Mountain View, California--.

Signed and Sealed this

Twenty-third Day of June, 1998

Attest:

BRUCE LEHMAN

*Attesting Officer*   *Commissioner of Patents and Trademarks*